(12) United States Patent
Wu et al.

(10) Patent No.: US 8,611,335 B1
(45) Date of Patent: Dec. 17, 2013

(54) SYSTEM AND METHOD FOR ASSIGNING PATHS FOR DATA FLOWS THROUGH A WIDE-AREA NETWORK

(75) Inventors: Yuguang Wu, Santa Clara, CA (US); Junlan Zhou, Sunnyvale, CA (US)

(73) Assignee: Google, Inc., Mountain View, CA (US)

( * ) Notice: Subject to any disclaimer, the term of this patent is extended or adjusted under 35 U.S.C. 154(b) by 915 days.

(21) Appl. No.: 12/541,092

(22) Filed: Aug. 13, 2009

(51) Int. Cl.
*H04L 12/28* (2006.01)

(52) U.S. Cl.
USPC .......................................... 370/351; 370/392

(58) Field of Classification Search
USPC .................................. 370/394, 230, 351, 392
See application file for complete search history.

(56) References Cited

U.S. PATENT DOCUMENTS

| 7,269,180 | B2 | 9/2007 | Bly et al. | |
|---|---|---|---|---|
| 7,558,199 | B1 * | 7/2009 | Minei et al. | 370/230 |
| 2010/0103937 | A1 * | 4/2010 | O'Neil | 370/392 |
| 2010/0235675 | A1 | 9/2010 | Subramanian et al. | |

* cited by examiner

*Primary Examiner* — Dang Ton
*Assistant Examiner* — Mandish Randhawa
(74) *Attorney, Agent, or Firm* — Morgan, Lewis & Bockius LLP

(57) ABSTRACT

A system and method to assign paths for data flows through a wide area network. A plurality of data flows is received, wherein a respective data flow in the plurality of data flows includes a respective source address and a respective destination address. An ordering of the plurality of data flows is generated. The ordering of the plurality of data flows are iteratively modified until a cost associated with path assignments for the ordering of the plurality of data flows satisfies a predetermined condition, wherein a respective path assignment for a respective data flow specifies a respective path from a respective source address to a respective destination address. The data flows are executed based on the path assignments for the ordering of the plurality of data flows having the cost that satisfies the predetermined condition.

24 Claims, 9 Drawing Sheets

SYSTEM AND METHOD FOR ASSIGNING PATHS FOR DATA FLOWS THROUGH A WIDE-AREA NETWORK

TECHNICAL FIELD

The disclosed embodiments relate generally to routing packets through a wide-area network. More particularly, the disclosed embodiments relate to a system and a method for assigning paths for data flows through a wide-area network.

BACKGROUND

Multiprotocol label switching (MPLS) networks may be used to forward large data flows (e.g., petabytes of data each) through the MPLS network from a source to a destination. These flows must be assigned to label-switched paths (LSPs) that connect the source and the destination while achieving predetermined optimization criteria (e.g., efficient use of bandwidth, minimization of latency, or satisfaction of a given number of parallel paths for each flow for load-balancing). However, selecting optimal LSPs in long-haul computer networks is difficult because the data flows (e.g., from a particular source to a particular destination) come and go. Existing techniques for assigning paths for data flows assume that there is a predetermined ordering of the data flows. The paths for the data flows are assigned based on the predetermined ordering of the data flows. The predetermined ordering of the data flows is typically determined based on priorities of the data flow. Unfortunately, if the data flows do not include priorities or if two or more data flows have the same priority, the ordering of the data flows is undetermined. Furthermore, as each path is assigned to a data flow, the remaining network resources decrease. The paths assigned to data flows with lower ordering may have paths that are non-optimal. Furthermore, the assignment of the paths for the data flows based on the ordering of the data flows may not be an optimal assignment of paths.

Accordingly, a system and method for assigning paths to data flows without the aforementioned problems is highly desirable.

SUMMARY

To address the aforementioned problems, some embodiments provide a system, a computer-implemented method, and a computer-readable storage medium including instructions to assign paths for data flows through a wide area network. In these embodiments, a plurality of data flows is received, wherein a respective data flow in the plurality of data flows includes a respective source address and a respective destination address. Next, an ordering of the plurality of data flows is generated. The ordering of the plurality of data flows is iteratively modified until a cost associated with path assignments for the ordering of the plurality of data flows satisfies a predetermined condition, wherein a respective path assignment for a respective data flow specifies a respective path from a respective source address to a respective destination address. The data flows are then executed based on the path assignments for the ordering of the plurality of data flows having the cost that satisfies the predetermined condition.

In some embodiments, the ordering of the plurality of data flows is generated by generating a random ordering of the plurality of data flows.

In some embodiments, the ordering of the plurality of data flows is iteratively modified by performing the following operations until the cost associated with the path assignments for the ordering of the plurality of data flows satisfies the predetermined condition. For each data flow in the ordering of the plurality of data flows, a path is assigned from a source address of the data flow to a destination address of the data flow to produce a path assignment for the data flow, wherein the path assignments are made for the data flows in the order specified by the ordering of the plurality of data flows. The cost of the path assignments for the ordering of the plurality of data flows is calculated. It is determined whether the cost of the path assignments for the ordering of the data flows satisfies the predetermined condition. If the cost of the path assignments for the ordering of the data flows does not satisfy the predetermined condition, the ordering of the plurality of data flows is modified.

In some embodiments, the ordering of the plurality of data flows is modified by applying a randomization technique to the plurality of data flows.

In some embodiments, the randomization technique is selected from the group consisting of a simulated annealing technique, a genetic algorithm technique, and a hill-climbing technique.

In some embodiments, the path is assigned from the source address of the data flow to the destination address of the data flow to produce the path assignment for the data flow by determining a shortest path from the source address of the data flow to the destination address of the data flow based on an available bandwidth of the network, assigning the shortest path as the path assignment for the data flow, determining the bandwidth used for the shortest path, and subtracting the bandwidth used for the shortest path from the available bandwidth of the network.

In some embodiments, the ordering of the plurality of data flows is modified by applying one or more mutation operations selected from the group consisting of: reversing the ordering of the plurality of data flows, swapping a first half of the data flows with a second half of the data flows in the ordering of the plurality of data flows, interleaving the first half of the data flows with the second half of the data flows in the ordering of the plurality of data flows, reversing the ordering of the first half of the data flows and interleaving the first half of the data flows with the second half of the data flows in the ordering of the plurality of data flows, performing a circular shift about a predetermined data flow in the ordering of the plurality of data flows, performing a reverse circular shift about the predetermined data flow in the ordering of the plurality of data flows, swapping adjacent data flows in the ordering of the plurality of data flows, and swapping non-adjacent data flows in the ordering of the plurality of data flows.

In some embodiments, the cost is calculated based on factors including one or more of a minimum remaining available bandwidth of any link in the network, an average length of newly assigned paths, an average length of newly assigned paths and existing paths.

In some embodiments, the predetermined condition is selected from the group consisting of a predetermined number of iterations has been performed and a change in an improvement of the cost over a series of path assignments for the plurality of data flows is below a predetermined threshold.

BRIEF DESCRIPTION OF THE DRAWINGS

Like reference numerals refer to corresponding parts throughout the drawings.

DESCRIPTION OF EMBODIMENTS

Figure 1:
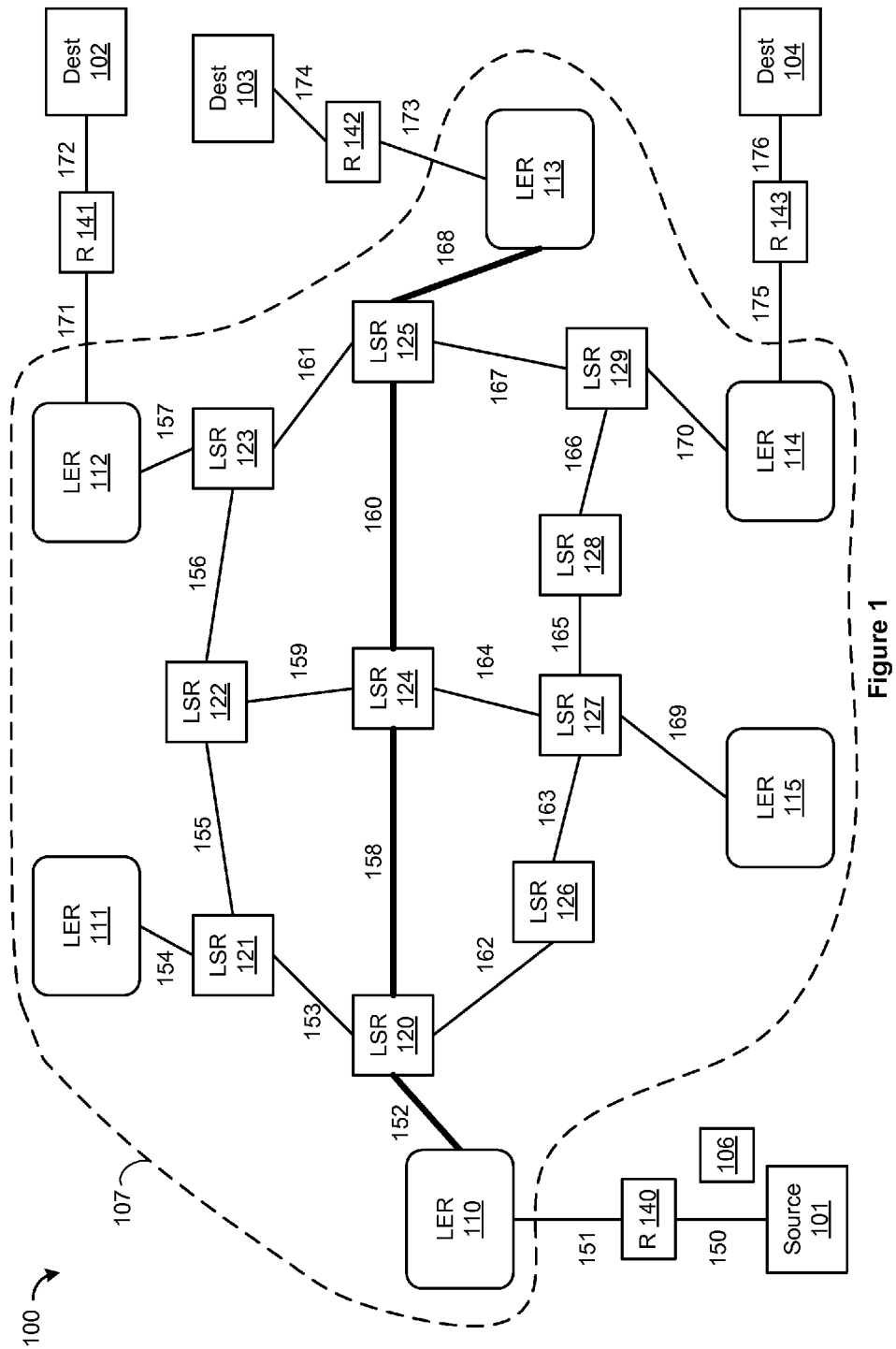
FIG. 1 is a block diagram illustrating a network, according to some embodiments.

FIG. 1 is a block diagram illustrating a network 100, according to some embodiments. The network 100 includes a multiprotocol label switching (MPLS) network 107. The MPLS network 107 includes label edge routers (LERs) 110-115 and label switch routers (LSRs) 120-129. The LERs 110-115 are interconnected with the LSRs 120-129 through links 152-170. Note that although FIG. 1 illustrates one MPLS network (i.e., the MPLS network 107), the network 100 may include more than one MPLS network.

The network 100 also includes routers 140-143. The router 140 is coupled to the LER 110 and a source 101 through links 151 and 150, respectively. The router 141 is coupled to the LER 112 and a destination 102 through links 171 and 172, respectively. The router 142 is coupled to the LER 113 and a destination 103 through links 173 and 174, respectively. The router 143 is coupled to the LER 114 and a destination 104 through links 175 and 176, respectively. Note that in general, any number of sources, destinations, routers, and/or links may be included in the network 100.

Figure 2:
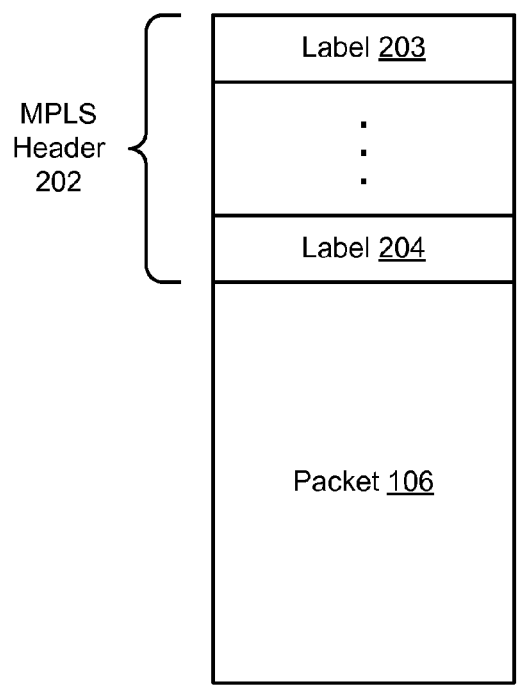
FIG. 2 is a block diagram illustrating a packet, according to some embodiments.

The MPLS network 107 is a network in which packet-forwarding decisions are made based on labels that encapsulate a packet. For example, consider a packet 106 that is to be transmitted from the source 101 to the destination 103. The source 101 first generates the packet 106 including a source address of the source 101, a destination address of the destination 103, and data. The source 101 then transmits the packet 106 to the router 140. Note that there may be other routers located between the source 101 and the router 140. The router 140 then transmits the packet 106 to the LER 110. The LER 110 analyzes the packet 106 and assigns one or more labels to the packet 106. FIG. 2 is a block diagram 200 illustrating the packet 106, according to some embodiments. As illustrated in FIG. 2, the LER 110 assigns one or more labels 203-204 to the packet 106. The one or more labels 203-204 are included in a MPLS header 202. The MPLS header 202 is also referred to as a "label stack." Each of the one or more labels 203-204 specifies a path through the MPLS network 107. When assigning the one or more labels 203-204 to the packet 106, the LER 110 considers several factors (e.g., current network traffic, available bandwidth, latency, etc.). In this example, the LER 110 assigns a path including the LSRs 120, 124, and 125 and LER 113 (i.e., the shortest path to the destination 103) and pushes labels corresponding to each of the LSRs 120, 124, and 125 and the LER 113 in reverse order so that the label corresponding to the LSR 120 is at the top of the label stack. After assigning the one or more labels 203-204 to the packet 106, the LER 110 transmits the packet through the MPLS network 107 based on the outer label (i.e., the top-most label on the label stack). Continuing with the above example, the LER 110 transmits the packet 106 to the LSR 120.

When the LSR 120 (or any other LSR) receives the respective packet, the LSR 120 analyzes the outer label (i.e., the top-most label) and performs one of three operations on the label stack. The LSR 120 may perform a swap operation that swaps the outer label with a new label. The LSR 120 may also perform a push operation that adds a new label to the top of the label stack (i.e., the outer label). Finally, the LSR 120 may perform a pop operation that removes the outer label from the respective packet. If there are no other labels in the label stack, the respective packet leaves the MPLS network. After performing one of these three operations, the LSR 120 forwards the respective packet along a path associated with the outer label. Continuing with the above example, the LSR 120 pops the outer label from label stack of the packet 106 and transmits the packet 106 to the next LSR based on the outer label of the label stack. Subsequent LSRs in the path perform similar operations on the label stack of the packet 106 until the packet 106 reaches the LER 113. When the packet 106 reaches the LER 113, the last label is popped from the label stack leaving only the packet 106. At this point, the packet 106 leaves the MPLS network 107. In this case, the LER 113 transmits the packet 106 to the router 140, which in turn transmits the packet 106 to the destination 103.

Note that in the above description, the LER 110 analyzed the source and destination of the packet and assigned a path for the packet. However, a separate computer system may perform this analysis and assign a path for the packet (and push labels associated with the path onto the label stack for the packet).

Figure 3:
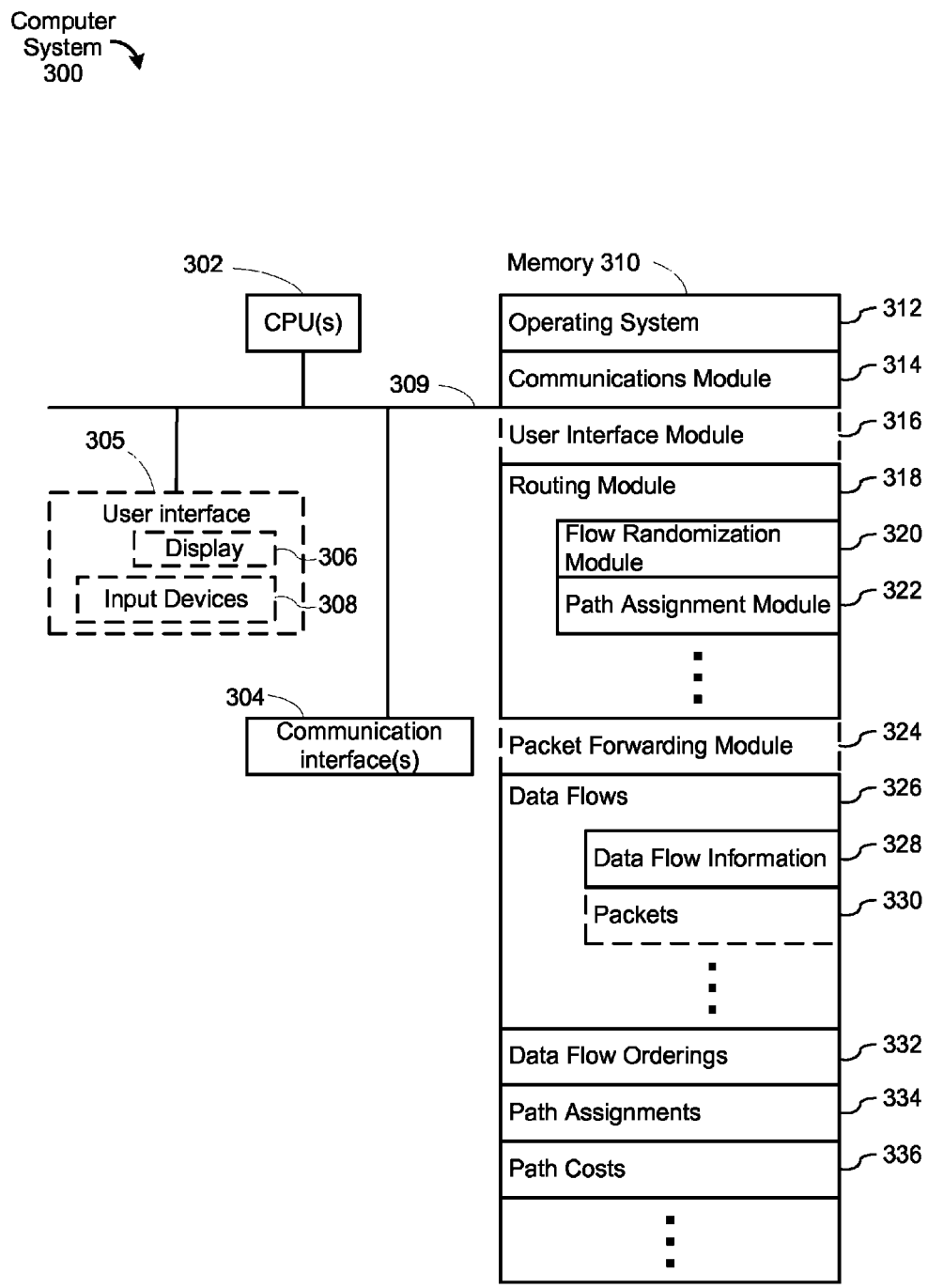
FIG. 3 is a block diagram illustrating a computer system, according to some embodiments.

FIG. 3 is a block diagram illustrating a computer system 300, according to some embodiments. The computer system 300 may be any of the LERs 110-115, LSRs 120-129, or routers 140-143. The computer system 300 may also be a standalone computer system or server. The computer system 300 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The computer system 300 may optionally include a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a computer readable storage medium. In some embodiments, memory 310 stores the following programs, modules and data structures, or a subset thereof:

an operating system 312 that includes procedures for handling various basic system services and for performing hardware dependent tasks;

a communication module 314 that is used for connecting the computer system 300 to other computer systems via the one or more communication interfaces 304 (wired or wireless) and one or more communication networks, such as the Internet, other wide area networks, local area networks, metropolitan area networks, and so on;

an optional user interface module 316 that receives commands from the user via the input devices 308 and generates user interface objects in the display device 306;

a routing module 318 that assigns paths to flows, as described herein, the routing module 318 including a flow randomization module 320 that randomizes the ordering of the data flows and a path assignment module 322 that calculates costs of paths and assigns paths to the data flows;

an optional packet forwarding module 324 that forwards packets of data flows based on the paths assigned to the data flows;

data flows 326;

data flow orderings 332 that are orderings of the data flows 326 determined by the flow randomization module 320;

path assignments 334 that are paths assigned to the data flows 326 by the path assignment module 322; and path costs 336 that are calculated by the path assignment module 322 and that include individual path costs for each paths assigned to data flows 326 and/or aggregate path costs for the paths assigned to the data flows 326.

In some embodiments, the data flows 326 include the packets 330 (or data) to be transmitted through the network 100. In some embodiments, the data flows 326 only include data flow information 328 for the data flows 326. For example, the data flow information 328 for a respective data flow may include: a source address for the data flow, a destination address for the data flow, a priority of the data flow, a size of the data flow (e.g., number of bytes), and the like.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows a "computer system," FIG. 3 is intended more as functional description of the various features which may be present in a set of computer systems than as a structural schematic of the embodiments described herein. In practice, and as recognized by those of ordinary skill in the art, items shown separately could be combined and some items could be separated. For example, some items shown separately in FIG. 3 could be implemented on single computer systems and single items could be implemented by one or more computer systems. The actual number of computer systems used to implement a computer system and how features are allocated among them will vary from one implementation to another, and may depend in part on the amount of data traffic that the system must handle during peak usage periods as well as during average usage periods.

As discussed above, existing techniques for assigning paths for data flows assume that there is a predetermined ordering of the data flows. This assumption may lead to path assignments for the data flows that are non-optimal. Thus, in some embodiments, the ordering of the data flows is iteratively modified to identify an ordering of the data flow that produces path assignments for the data flows that satisfy predefined criteria. These embodiments are described with respect to FIGS. 4-6 below.

Figure 4:
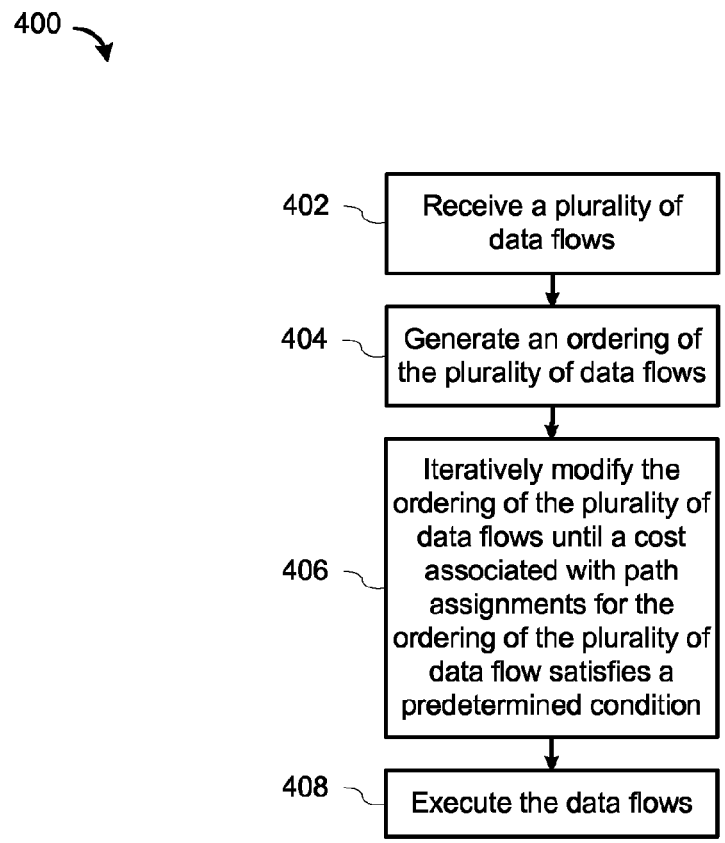
FIG. 4 is a flowchart of a method for assigning paths for data flows through a wide-area network, according to some embodiments.

FIG. 4 is a flowchart of a method 400 for assigning paths for data flows through a wide-area network, according to some embodiments. The routing module 318 receives (402) a plurality of data flows (e.g., the data flows 326), wherein a respective data flow in the plurality of data flows includes a respective source address and a respective destination address. In some embodiments, the routing module 318 receives the plurality of data flows from a single source. For example, the routing module 318 may receive the plurality of data flows from a single customer that desires to transmit the plurality of data flows to multiple destinations. In some embodiments, the routing module 318 receives the plurality of flows from two or more sources. For example, the routing module 318 may receive the plurality of data flows from a plurality of customers that desire to transfer data through the MPLS network 107. In some embodiments, the computer system 300 (e.g., a standalone computer system or a LER) is located at the edge of the MPLS network 107. In these embodiments, the computer system 300 processes the plurality of data flows prior the packets of the plurality of data flows entering the MPLS network 107.

In some embodiments, the routing module 318 receives data flow information (e.g., the data flow information 328) for the plurality of data flows. As discussed above, the data flow information for a respective data flow may include: a source address for the data flow, a destination address for the data flow, a priority of the data flow, a size of the data flow (e.g., number of bytes), and the like. In some embodiments, the routing module 318 receives packets (or data) for the data flow (e.g., the packets 330) for the plurality of data flows. In these embodiments, the routing module 318 determines the data flow information (e.g., the data flow information 328) based on the packets (or data).

Next, the routing module 318 generates (404) an ordering of the plurality of data flows. In some embodiments, the flow randomization module 320 generates a random ordering of the plurality of data flows. The routing module 318 then iteratively modifies (406) the ordering of the plurality of data flows until a cost associated with path assignments for the ordering of the plurality of data flows satisfies a predetermined condition, wherein a respective path assignment for a respective data flow specifies a respective path from a respective source address to a respective destination address.

Figure 5:
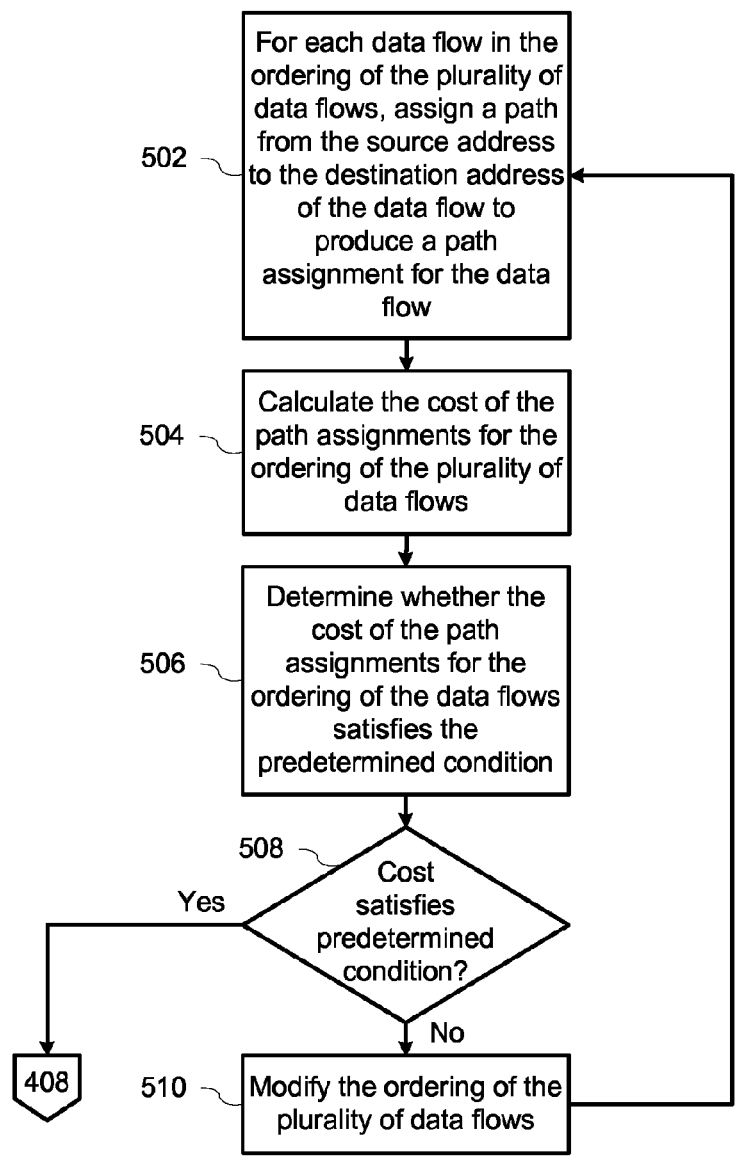
FIG. 5 is a flowchart of a method for iteratively modifying the ordering of a plurality of data flows, according to some embodiments.
Figure 6:
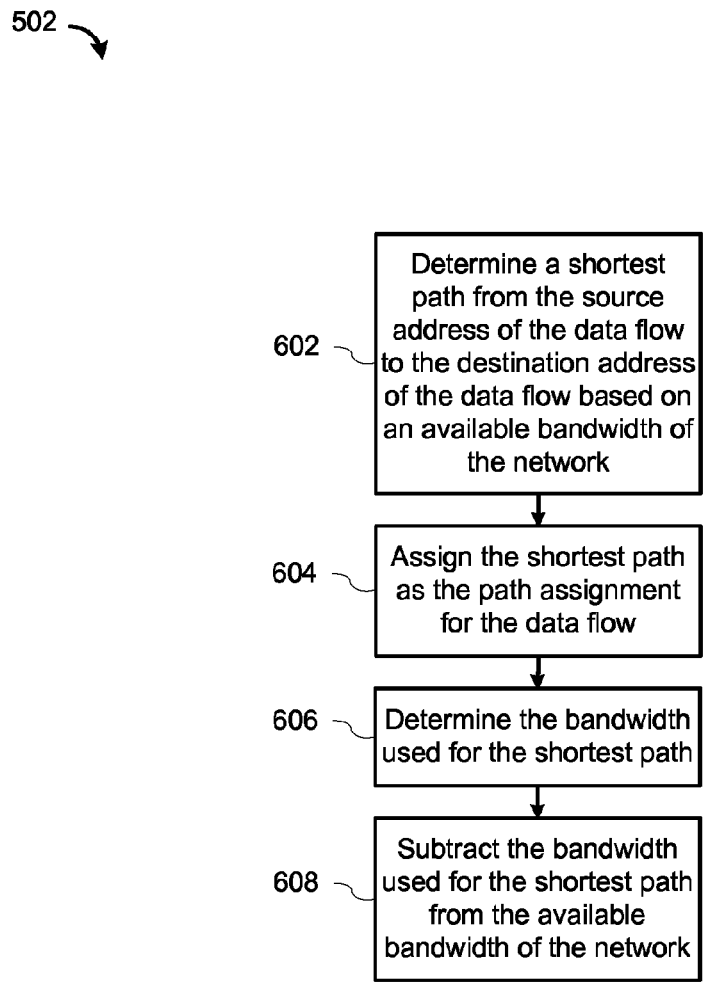
FIG. 6 is a flowchart of a method for assigning the path from the source address of the data flow to the destination address of the data flow, according to some embodiments.

FIG. 5 is a flowchart of a method for iteratively modifying (406) the ordering of a plurality of data flows, according to some embodiments. The path assignment module 322 performs the following operations until the cost associated with the path assignments for the ordering of the plurality of data flows satisfies the predetermined condition. For each data flow in the ordering of the plurality of data flows, the path assignment module 322 assigns (502) a path from a source address of the data flow to a destination address of the data flow to produce a path assignment for the data flow, wherein the path assignments are made for the data flows in the order specified by the ordering of the plurality of data flows. FIG. 6 is a flowchart of a method for assigning (502) the path from the source address of the data flow to the destination address of the data flow to produce the path assignment for the data flow, according to some embodiments. The path assignment module 322 determines (602) a shortest path from the source address of the data flow to the destination address of the data flow based on an available bandwidth of the network. For example, Dijkstra's algorithm may be used to determine the shortest path from the source address of the data flow to the destination address of the data flow. Next, the path assignment module 322 assigns (604) the shortest path as the path assignment for the data flow. The path assignment module 322 then determines (606) the bandwidth used for the shortest path and subtracts (608) the bandwidth used for the shortest path from the available bandwidth of the network.

Returning to FIG. 5, the path assignment module 322 calculates (504) the cost of the path assignments for the ordering of the plurality of data flows. In some embodiments, the cost is calculated based on factors including one or more of a minimum remaining available bandwidth of any link in the network, an average length (e.g., the number of hops, which is proportional to the latency, etc.) of newly assigned paths, and an average length of newly assigned paths and existing paths. Note that if a path cannot be assigned to a data flow, the cost of the path assignments is infinite.

In some embodiments, the cost of the path assignments for the ordering of the plurality of data flows is the cost of the path assignments that has the maximum cost. For example, for paths $P_1, P_2, \ldots,$ and $P_n$ having corresponding costs $c_1, c_2, c_n$, the cost, C, of the path assignments is $C = \max(\{c_1 \ldots c_n\})$. In some embodiments, the cost of the path assignments for the ordering of the plurality of data flows is the average cost of the path assignments. Continuing the same example as above, the cost, C, of the path assignments is $$C = \sum_{i=1}^{n} \frac{c_i}{n}.$$

In some embodiments, the cost of a path assignment for a data flow is the number of hops for the path assignment. In some embodiments, the cost of a path assignment for a data flow is the latency for the path assignment. In some embodiments, the cost of a path assignment for a data flow is the bandwidth used for the path assignment. In these embodiments, the bandwidth used for the path assignment for a data flow is the bandwidth cost for each link in the path assignment. For example, assume that the path $P_i$ has a bandwidth requirement of $d_i$ and includes links $L_1, L_2, \ldots,$ and $L_m$ with corresponding bandwidth costs $p_1, p_2, \ldots, p_m$. The cost $c_i$ for the path $$P_i \text{ is } c_i = d_i \sum_{j=1}^{m} p_j.$$

In some embodiments, the cost of a path assignment for a data flow is a function of one or more of the number of hops for the path assignment, the latency for the path assignment, and the bandwidth used for the path assignment.

The path assignment module 322 then determines (506) whether the cost of the path assignments for the ordering of the data flows satisfies the predetermined condition. In some embodiments, the predetermined condition includes one or more of a predetermined number of iterations has been performed, and a change in an improvement of the cost over a series of path assignments for the plurality of data flows is below a predetermined threshold. For example, if the maximum number of iterations is 15, the predetermined condition is satisfied when the number of iterations performed is 15. Alternatively, if the predetermined threshold for a change in improvement is 1%, the predetermined condition is satisfied when the change in improvement of the cost over a series of path assignments is below 1%. In some embodiments, the path assignment module 322 stores one or more previously determined path assignments and corresponding costs of the path assignments.

If the cost of the path assignments for the ordering of the data flows does not satisfy the predetermined condition (508, no), the flow randomization module 320 modifies (510) the ordering of the plurality of data flows and returns to operation 502.

In some embodiments, the ordering of the plurality of data flows is modified by applying a randomization technique to the plurality of data flows. In some embodiments, the randomization technique is selected from the group consisting of a simulated annealing technique, a genetic algorithm technique, a hill-climbing technique.

Figure 7A:
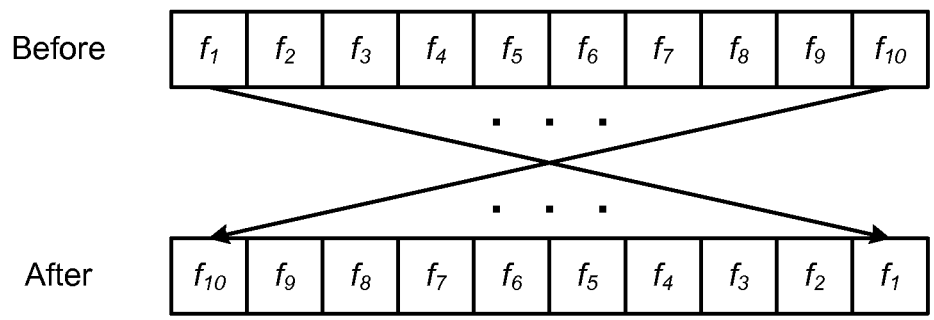
FIG. 7A is a block diagram illustrating a mutation operation, according to some embodiments.
Figure 7B:
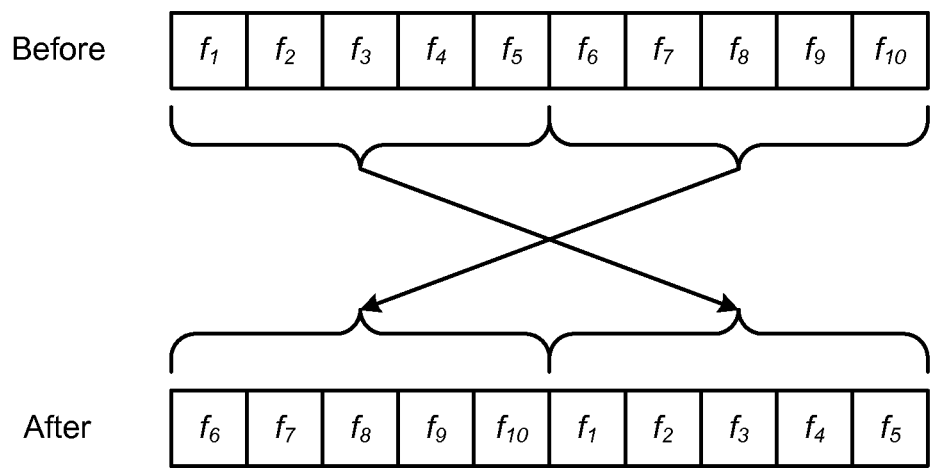
FIG. 7B is a block diagram illustrating another mutation operation, according to some embodiments.
Figure 7C:
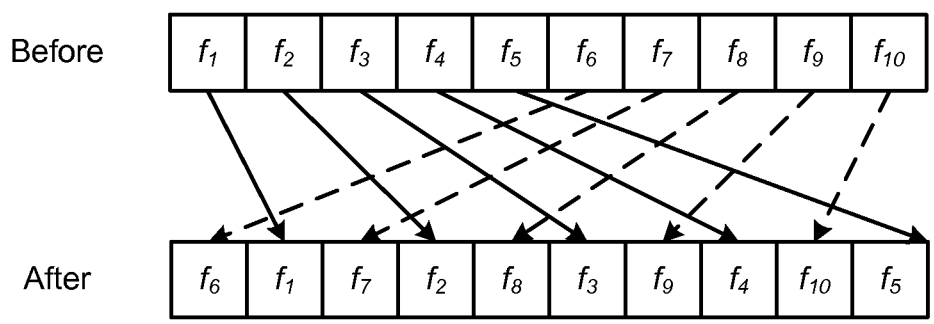
FIG. 7C is a block diagram illustrating another mutation operation, according to some embodiments.
Figure 7D:
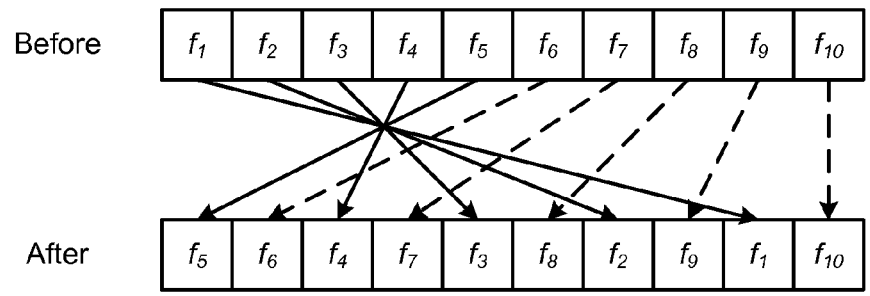
FIG. 7D is a block diagram illustrating another mutation operation, according to some embodiments.
Figure 7E:
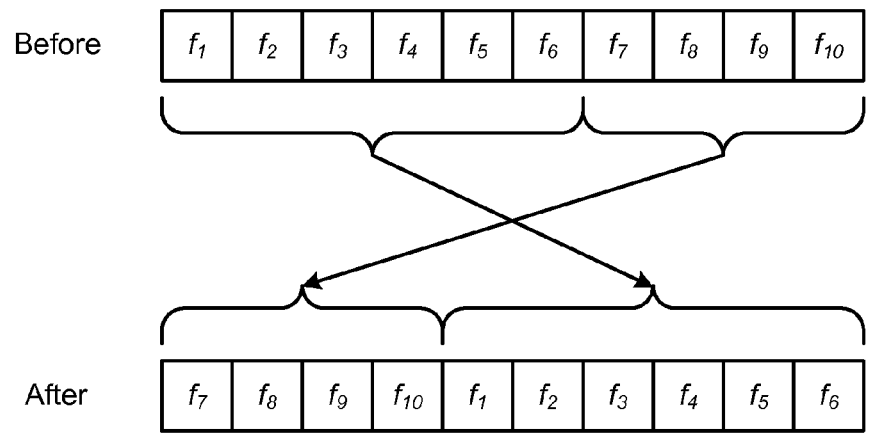
FIG. 7E is a block diagram illustrating another mutation operation, according to some embodiments.
Figure 7F:
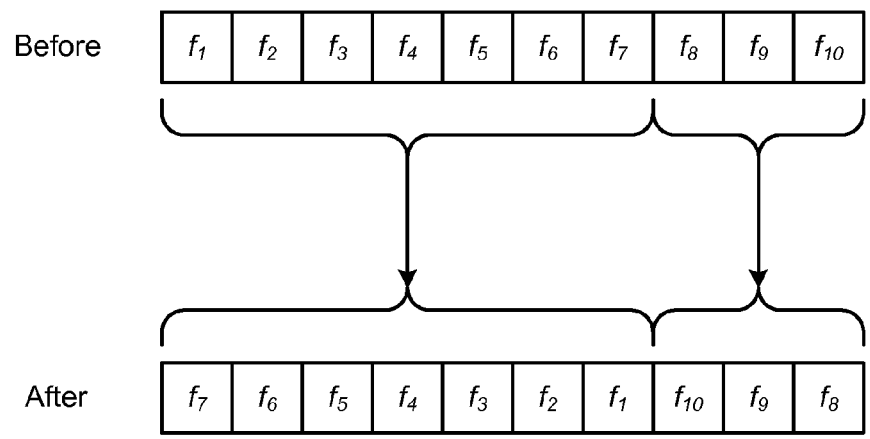
FIG. 7F is a block diagram illustrating another mutation operation, according to some embodiments.
Figure 7G:
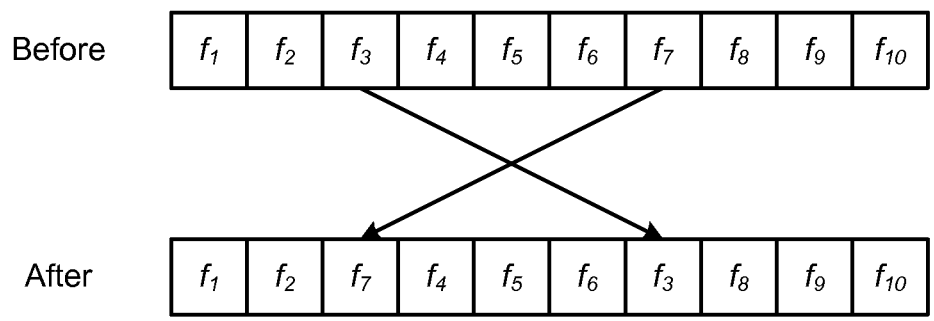
FIG. 7G is a block diagram illustrating another mutation operation, according to some embodiments.
Figure 7H:
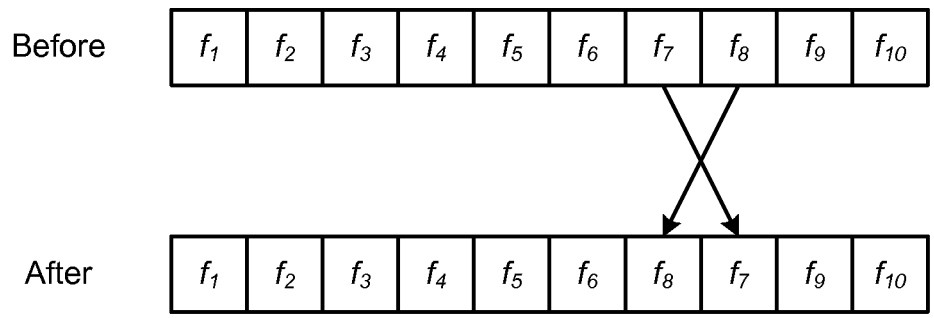
FIG. 7H is a block diagram illustrating another mutation operation, according to some embodiments.

In some embodiments, the flow randomization module 320 modifies the ordering of the plurality of data flows, $f_i$, by applying one or more mutation operations. An example is provided for each of the mutation operations in which a respective mutation operation operates on an exemplary ordering of the data flows $f_1, f_2, f_3, f_4, f_5, f_6, f_7, f_8, f_9, f_{10}$. The path assignment module 322 reverses the ordering of the plurality of data flows (e.g., the new ordering of the plurality of data flows is $f_{10}, f_9, f_8, f_7, f_6, f_5, f_4, f_3, f_2, f_1$, as illustrated in FIG. 7A). The path assignment module 322 swaps a first half of the data flows with a second half of the data flows in the ordering of the plurality of data flows (e.g., the new ordering of the plurality of data flows is $f_6, f_7, f_8, f_9, f_{10}, f_1, f_2, f_3, f_4, f_5$, as illustrated in FIG. 7B). The path assignment module 322 interleaves the first half of the data flows with the second half of the data flows in the ordering of the plurality of data flows (e.g., the new ordering of the plurality of data flows is $f_6, f_1, f_7, f_2, f_8, f_3, f_9, f_4, f_{10}, f_5$, as illustrated in FIG. 7C). The path assignment module 322 reverses the ordering of the first half of the data flows and interleaves the first half of the data flows with the second half of the data flows in the ordering of the plurality of data flows (e.g., the new ordering of the plurality of data flows is $f_5, f_6, f_4, f_7, f_3, f_8, f_2, f_9, f_1, f_{10}$, as illustrated in FIG. 7D). The path assignment module 322 performs a circular shift about a predetermined data flow in the ordering of the plurality of data flows (e.g., for a circular shift about $f_7$, the new ordering of the plurality of data flows is $f_7, f_8, f_9, f_{10}, f_1, f_2, f_3, f_4, f_5, f_6$, as illustrated in FIG. 7E). The path assignment module 322 performs a reverse circular shift (i.e., reversing the ordering of the data flows and performing a circular shift) about the predetermined data flow in the ordering of the plurality of data flows (e.g., for a reverse circular shift about $f_7$, the new ordering of the plurality of data flows is $f_7, f_6, f_5, f_4, f_3, f_2, f_1, f_{10}, f_9, f_8$, as illustrated in FIG. 7F). The path assignment module 322 swaps non-adjacent data flows in the ordering of the plurality of data flows (e.g., swapping the $f_7$ and $f_3$, the new ordering of the plurality of data flows is $f_1, f_2, f_7, f_4, f_5, f_6, f_3, f_8, f_9, f_{10}$, as illustrated in FIG. 7G). The path assignment module 322 swaps adjacent data flows in the ordering of the plurality of data flows (e.g., swapping $f_7$ and $f_8$, the new ordering of the plurality of data flows is $f_1, f_2, f_3, f_4, f_5, f_6, f_8, f_7, f_9, f_{10}$, as illustrated in FIG. 7H). Note that other mutation operations may be used.

In some cases, it is desirable to manually assign an ordering to a subset of the plurality of data flows. For example, if time-sensitive data must be transferred from a source to a destination within a specified time period, it is desirable to prioritize these data flows even if the overall cost of the path assignments produced by this manual ordering is not as optimal as a randomized ordering. Thus, in some embodiments, the flow randomization module 320 only modifies subset of the ordering of the plurality of data flows. In these embodiments, a manual ordering parameter may specify the relative or absolute ordering of a subset of the plurality of data flows. The flow randomization module 320 then generates the ordering of the plurality of data flows taking into to account values of the manual ordering parameter. For example, data flows $f_1$, $f_2$, and $f_3$ may be time-sensitive and may need to be transferred to their respective destinations as soon as possible. Thus, the flow randomization module 320 generates the ordering of the plurality of data flows so that the data flows $f_1$, $f_2$, and $f_3$ are always first, second, and third in the ordering of the plurality of data flows. However, the flow randomization module 320 may randomize the ordering of the data flows $f_4$ to $f_{10}$.

Since the path assignments for the plurality of data flows is deterministic for a particular ordering, only the ordering of the plurality of data flows needs to be stored. The path assignments can be recalculated based on the ordering of the plurality of data flows. In some embodiments, the flow randomization module 320 stores all of the orderings of the plurality of data flows for previous iterations. In some embodiments, the flow randomization module 320 stores a subset of the orderings of the plurality of data flows for the previous iterations.

If the cost of the path assignments for the ordering of the data flows satisfies the predetermined condition (508, yes), method proceeds to operation 408 in FIG. 4.

Returning to FIG. 4, the packet forwarding module 324 then executes (408) the data flows based on the path assignments for the ordering of the plurality of data flows having the cost that satisfies the predetermined condition. In some embodiments, the path assignments are executed by a router that is separate and distinct from the computer system 300. In these embodiments, the computer system 300 only determines the path assignments for the data flows.

The state of the plurality of data flows constantly changes. For example, data flows may complete or be terminated, thereby freeing up network resources. Similarly, new data flows may be received and paths must be allocated for these resources. Thus, in some embodiments, when the routing module 318 detects a change in the state of the plurality of data flows, the routing module 318 performs the operations described with respect to FIGS. 4-6 to determine new path assignments for the plurality of data flows. In some embodiments, when the routing module 318 detects a change in the state of the plurality of data flows, the routing module 318 does not modify the path assignments for the data flows that have previously been assigned paths. In these embodiments, the routing module 318 assigns paths to new data flows based on the available network resources.

The methods described in FIGS. 4-6 may be governed by instructions that are stored in a computer readable storage medium and that are executed by one or more processors of one or more servers. Each of the operations shown in FIGS. 4-6 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for assigning paths for data flows through a wide-area network, comprising:
at a computer system including one or more processors and memory storing one or more programs, the one or more processors executing the one or more programs to perform the operations of:
receiving a plurality of data flows, wherein a respective data flow in the plurality of data flows and includes a respective source address and a respective destination address;
generating, without regard to priorities associated with the plurality of data flows, an ordering of the plurality of data flows;
iteratively modifying, without regard to the priorities, the ordering of the plurality of data flows until a cost associated with path assignments for the ordering of the plurality of data flows satisfies a predetermined condition, wherein a respective path assignment for a respective data flow specifies a respective path from a respective source address to a respective destination address; and
executing the data flows based on the path assignments for the ordering of the plurality of data flows having the cost that satisfies the predetermined condition;
wherein iteratively modifying, without regard to the priorities, the ordering of the plurality of data flows includes: applying one or more mutation operations selected from the group consisting of:
swapping a first half of the data flows with a second half of the data flows in the ordering of the plurality of data flows;
interleaving the first half of the data flows with the second half of the data flows in the ordering of the plurality of data flows;
reversing the ordering of the first half of the data flows and interleaving the first half of the data flows with the second half of the data flows in the ordering of the plurality of data flows;
performing a circular shift about a predetermined data flow in the ordering of the plurality of data flows;
performing a reverse circular shift about the predetermined data flow in the ordering of the plurality of data flows;
swapping adjacent data flows in the ordering of the plurality of data flows; and
swapping non-adjacent data flows in the ordering of the plurality of data flows.

2. The method of claim 1, wherein generating the ordering of the plurality of data flows includes generating a random ordering of the plurality of data flows.

3. The method of claim 1, wherein iteratively modifying the ordering of the plurality of data flows until the cost associated with path assignments for the ordering the plurality of data flows satisfies the predetermined condition includes:
performing the following operations until the cost associated with the path assignments for the ordering of the plurality of data flows satisfies the predetermined condition:
for each data flow in the ordering of the plurality of data flows, assigning a path from a source address of the data flow to a destination address of the data flow to produce a path assignment for the data flow, wherein the path assignments are made for the data flows in the order specified by the ordering of the plurality of data flows;
calculating the cost of the path assignments for the ordering of the plurality of data flows;
determining whether the cost of the path assignments for the ordering of the data flows satisfies the predetermined condition; and
if the cost of the path assignments for the ordering of the data flows does not satisfy the predetermined condition, modifying the ordering of the plurality of data flows.

4. The method of claim 3, wherein modifying the ordering of the plurality of data flows includes applying a randomization technique to the plurality of data flows.

5. The method of claim 4, wherein the randomization technique is selected from the group consisting of:
a simulated annealing technique;
a genetic algorithm technique; and
a hill-climbing technique.

6. The method of claim 3, wherein assigning the path from the source address of the data flow to the destination address of the data flow to produce the path assignment for the data flow includes:
determining a shortest path from the source address of the data flow to the destination address of the data flow based on an available bandwidth of the network;
assigning the shortest path as the path assignment for the data flow;
determining the bandwidth used for the shortest path; and
subtracting the bandwidth used for the shortest path from the available bandwidth of the network.

7. The method of claim 1, wherein the cost is calculated based on factors including one or more of:
a minimum remaining available bandwidth of any link in the network;
an average length of newly assigned paths; and
an average length of newly assigned paths and existing paths.

8. The method of claim 1, wherein the predetermined condition is selected from the group consisting of:
a predetermined number of iterations has been performed; and
a change in an improvement of the cost over a series of path assignments for the plurality of data flows is below a predetermined threshold.

9. A system, comprising:
one or more processors;
memory; and
one or more programs stored in the memory, the one or more programs comprising instructions to:
receive a plurality of data flows, wherein a respective data flow in the plurality of data flows and includes a respective source address and a respective destination address;
generate, without regard to priorities associated with the plurality of data flows, an ordering of the plurality of data flows;
iteratively modify, without regard to the priorities, the ordering of the plurality of data flows until a cost associated with path assignments for the ordering of the plurality of data flows satisfies a predetermined condition, wherein a respective path assignment for a respective data flow specifies a respective path from a respective source address to a respective destination address; and
execute the data flows based on the path assignments for the ordering of the plurality of data flows having the cost that satisfies the predetermined condition;
wherein iteratively modifying, without regard to the priorities, the ordering of the plurality of data flows includes: applying one or more mutation operations selected from the group consisting of:
swapping a first half of the data flows with a second half of the data flows in the ordering of the plurality of data flows;
interleaving the first half of the data flows with the second half of the data flows in the ordering of the plurality of data flows;
reversing the ordering of the first half of the data flows and interleaving the first half of the data flows with the second half of the data flows in the ordering of the plurality of data flows;
performing a circular shift about a predetermined data flow in the ordering of the plurality of data flows;
performing a reverse circular shift about the predetermined data flow in the ordering of the plurality of data flows;
swapping adjacent data flows in the ordering of the plurality of data flows; and
swapping non-adjacent data flows in the ordering of the plurality of data flows.

10. The system of claim 9, wherein the instructions to generate the ordering of the plurality of data flows include instructions to generate a random ordering of the plurality of data flows.

11. The system of claim 9, wherein the instructions to iteratively modify the ordering of the plurality of data flows until the cost associated with path assignments for the ordering the plurality of data flows satisfies the predetermined condition include instructions to:
perform the following operations until the cost associated with the path assignments for the ordering of the plurality of data flows satisfies the predetermined condition:
for each data flow in the ordering of the plurality of data flows, assign a path from a source address of the data flow to a destination address of the data flow to produce a path assignment for the data flow, wherein the path assignments are made for the data flows in the order specified by the ordering of the plurality of data flows;
calculate the cost of the path assignments for the ordering of the plurality of data flows;
determine whether the cost of the path assignments for the ordering of the data flows satisfies the predetermined condition; and
if the cost of the path assignments for the ordering of the data flows does not satisfy the predetermined condition, modify the ordering of the plurality of data flows.

12. The system of claim 11, wherein the instructions to modify the ordering of the plurality of data flows include instructions to apply a randomization technique to the plurality of data flows.

13. The system of claim 12, wherein the randomization technique is selected from the group consisting of:
 a simulated annealing technique;
 a genetic algorithm technique; and
 a hill-climbing technique.

14. The system of claim 11, wherein the instructions to assign the path from the source address of the data flow to the destination address of the data flow to produce the path assignment for the data flow include instructions to:
 determine a shortest path from the source address of the data flow to the destination address of the data flow based on an available bandwidth of the network;
 assign the shortest path as the path assignment for the data flow;
 determine the bandwidth used for the shortest path; and
 subtract the bandwidth used for the shortest path from the available bandwidth of the network.

15. The system of claim 9, wherein the cost is calculated based on factors including one or more of:
 a minimum remaining available bandwidth of any link in the network;
 an average length of newly assigned paths; and
 an average length of newly assigned paths and existing paths.

16. The system of claim 9, wherein the predetermined condition is selected from the group consisting of:
 a predetermined number of iterations has been performed; and
 a change in an improvement of the cost over a series of path assignments for the plurality of data flows is below a predetermined threshold.

17. A non-transitory computer readable storage medium storing one or more programs configured for execution by a computer, the one or more programs comprising instructions to:
 receive a plurality of data flows, wherein a respective data flow in the plurality of data flows and includes a respective source address and a respective destination address;
 generate, without regard to priorities associated with the plurality of data flows, an ordering of the plurality of data flows;
 iteratively modify, without regard to the priorities, the ordering of the plurality of data flows until a cost associated with path assignments for the ordering of the plurality of data flows satisfies a predetermined condition, wherein a respective path assignment for a respective data flow specifies a respective path from a respective source address to a respective destination address; and
 execute the data flows based on the path assignments for the ordering of the plurality of data flows having the cost that satisfies the predetermined condition;
 wherein iteratively modifying, without regard to the priorities, the ordering of the plurality of data flows includes:
  applying one or more mutation operations selected from the group consisting of:
   swapping a first half of the data flows with a second half of the data flows in the ordering of the plurality of data flows;
   interleaving the first half of the data flows with the second half of the data flows in the ordering of the plurality of data flows;
   reversing the ordering of the first half of the data flows and interleaving the first half of the data flows with the second half of the data flows in the ordering of the plurality of data flows;
   performing a circular shift about a predetermined data flow in the ordering of the plurality of data flows;
   performing a reverse circular shift about the predetermined data flow in the ordering of the plurality of data flows;
   swapping adjacent data flows in the ordering of the plurality of data flows; and
   swapping non-adjacent data flows in the ordering of the plurality of data flows.

18. The non-transitory computer readable storage medium of claim 17, wherein generating the ordering of the plurality of data flows includes generating a random ordering of the plurality of data flows.

19. The non-transitory computer readable storage medium of claim 17, wherein iteratively modifying the ordering of the plurality of data flows until the cost associated with path assignments for the ordering the plurality of data flows satisfies the predetermined condition includes:
 performing the following operations until the cost associated with the path assignments for the ordering of the plurality of data flows satisfies the predetermined condition:
  for each data flow in the ordering of the plurality of data flows, assigning a path from a source address of the data flow to a destination address of the data flow to produce a path assignment for the data flow, wherein the path assignments are made for the data flows in the order specified by the ordering of the plurality of data flows;
  calculating the cost of the path assignments for the ordering of the plurality of data flows;
  determining whether the cost of the path assignments for the ordering of the data flows satisfies the predetermined condition; and
  if the cost of the path assignments for the ordering of the data flows does not satisfy the predetermined condition, modifying the ordering of the plurality of data flows.

20. The non-transitory computer readable storage medium of claim 19, wherein modifying the ordering of the plurality of data flows includes applying a randomization technique to the plurality of data flows.

21. The non-transitory computer readable storage medium of claim 20, wherein the randomization technique is selected from the group consisting of:
 a simulated annealing technique;
 a genetic algorithm technique; and
 a hill-climbing technique.

22. The non-transitory computer readable storage medium of claim 19, wherein assigning the path from the source address of the data flow to the destination address of the data flow to produce the path assignment for the data flow includes:
 determining a shortest path from the source address of the data flow to the destination address of the data flow based on an available bandwidth of the network;
 assigning the shortest path as the path assignment for the data flow;
 determining the bandwidth used for the shortest path; and
 subtracting the bandwidth used for the shortest path from the available bandwidth of the network.

23. The non-transitory computer readable storage medium of claim 17, wherein the cost is calculated based on factors including one or more of:
- a minimum remaining available bandwidth of any link in the network;
- an average length of newly assigned paths; and
- an average length of newly assigned paths and existing paths.

24. The non-transitory computer readable storage medium of claim 17, wherein the predetermined condition is selected from the group consisting of:
- a predetermined number of iterations has been performed; and
- a change in an improvement of the cost over a series of path assignments for the plurality of data flows is below a predetermined threshold.

* * * * *